US009197656B2

(12) United States Patent
Butler et al.

(10) Patent No.: US 9,197,656 B2
(45) Date of Patent: Nov. 24, 2015

(54) COMPUTER PROGRAM, METHOD, AND SYSTEM FOR PREVENTING EXECUTION OF VIRUSES AND MALWARE (71) Applicant: VoodooSoft Holdings, LLC, Overland Park, KS (US)

(72) Inventors: Daniel Earl Butler, Overland park, KS (US); E. Dywayne Johnson, Kansas City, MO (US)

(73) Assignee: VoodooSoft Holdings, LLC, Overland Park, KS (US)

( * ) Notice: Subject to any disclaimer, the term of this patent is extended or adjusted under 35 U.S.C. 154(b) by 0 days.

(21) Appl. No.: 14/187,007

(22) Filed: Feb. 21, 2014

(65) Prior Publication Data
US 2014/0173735 A1 Jun. 19, 2014

Related U.S. Application Data (63) Continuation of application No. 14/171,361, filed on Feb. 3, 2014, now abandoned, which is a continuation of application No. 13/479,044, filed on May 23, 2012, now abandoned.

(60) Provisional application No. 61/543,068, filed on Oct. 4, 2011, provisional application No. 61/493,166, filed on Jun. 3, 2011.

(51) Int. Cl.
*H04L 29/06* (2006.01)
*G06F 21/51* (2013.01)
*G06F 21/56* (2013.01)

(52) U.S. Cl.
CPC ............ *H04L 63/1416* (2013.01); *G06F 21/51* (2013.01); *G06F 21/565* (2013.01); *H04L 63/1408* (2013.01)

(58) Field of Classification Search
CPC ............ H04L 63/1614; H04L 63/1441; H04L 63/1425
USPC ......................................... 726/24
See application file for complete search history.

(56) References Cited

U.S. PATENT DOCUMENTS

| | | | | |
|---|---|---|---|---|
| 5,987,610 | A * | 11/1999 | Franczek et al. | 726/24 |
| 5,987,611 | A * | 11/1999 | Freund | 726/4 |
| 2002/0089528 | A1* | 7/2002 | Hay et al. | 345/712 |
| 2005/0120237 | A1* | 6/2005 | Roux et al. | 713/200 |
| 2007/0150956 | A1* | 6/2007 | Sharma et al. | 726/24 |
| 2010/0138918 | A1* | 6/2010 | Kim et al. | 726/22 |

* cited by examiner

Primary Examiner — Syed Zaidi
(74) Attorney, Agent, or Firm — Troutman Sanders LLP (57) ABSTRACT Preventing execution of viruses or malware on a computing device includes compiling an inventory recordation of legitimate applications and terminating execution of any application not on the inventory recordation while in a protected mode. An instantaneous and unprompted inventory recordation known as a "snapshot" can be performed by the computer program. A user may further train the computer program to identify legitimate applications routinely accessed by the user and to be updated to the inventory recordation, such that the inventory recordation is personal to the user. After training, the protected mode can be activated. A smart icon graphical user interface is utilized, that automatically toggles between locked and unlocked depending on if the computing device is at risk or not, to place the computing device in a protected or unprotected mode.

14 Claims, 8 Drawing Sheets

VoodooShield™
YOU ARE NOW PROTECTED

ADMIN HOME | MASTER PROCESS LIST | USERS | ACCOUNTS | ORDERS | LOG OUT

Master Process List

A|B|C|D|E|F|G|H|I|J|K|L|M|N|O|P|Q|R|S|T|U|V|W|X|Y|Z|All 98 entry(s) found.
Use these features to filter the Master Process List.
☐ Only Default Processes

[Add New]

| Name | Full Name | Description | Default Path | Is Virus | Is Default | User Count |
|---|---|---|---|---|---|---|
| audiodg | | | c:\windows\system32\audiodg.exe | | ☒ | 864 |
| chkdsk | chkdsk | | c:\Windows\system32\chkdsk.exe | | ☒ | 643 |
| cleanmgr | | | c:\windows\system32\cleanmgr.exe | | ☒ | 643 |
| compmgmtlauncher | | | c:\windows\system32\compmgmtlauncher.exe | | ☒ | 603 |
| conhost | | | c:\windows\system32\conhost.exe | | ☒ | 772 |
| control | | | c:\windows\system32\control.exe | | ☒ | 685 |
| defrag | | | c:\windows\system32\defrag.exe | | ☒ | 669 |
| devicedisplayobjectprovider | | | c:\windows\system32\devicedisplayobjectprovider.exe | | ☒ | 161 |
| devicedisplayobjectprovider.exe | | | c:\windows\system32\devicedisplayobjectprovider.exe | | | |
| deviceeject | DeviceEject | | c:\windows\system32\DeviceEject.exe | | ☒ | 618 |
| dfrgui | dfrgui.exe | | c:\windows\system32\dfrgui.exe | | ☒ | 642 |
| ... | ... | | | | ... | 0 |

COMPUTER PROGRAM, METHOD, AND SYSTEM FOR PREVENTING EXECUTION OF VIRUSES AND MALWARE

RELATED APPLICATIONS

This patent application is a continuation, and claims priority benefit with regard to all common subject matter, of earlier filed U.S. patent application Ser. No. 14/171,361, filed on Feb. 3, 2014, and entitled "COMPUTER PROGRAM, METHOD, AND SYSTEM FOR PREVENTING EXECUTION OF VIRUSES AND MALWARE." The patent application Ser. No. 14/171,361 is a continuation application of earlier-filed U.S. patent application Ser. No. 13/479,044, filed on May 23, 2012, and entitled "COMPUTER PROGRAM, METHOD, AND SYSTEM FOR PREVENTING EXECUTION OF VIRUSES AND MALWARE." The patent application Ser. No. 13/479,044 is a non-provisional, and claims priority benefit with regard to all common subject matter, of U.S. Provisional Patent Application No. 61/543,068, filed Oct. 4, 2011, and entitled "COMPUTER PROGRAM AND METHOD FOR PREVENTION OF INFECTION OR EXECUTION OF VIRUSES AND MALWARE," and U.S. Provisional Patent Application No. 61/493,166, filed Jun. 3, 2011, and entitled "COMPUTER PROGRAM AND METHOD FOR PREVENTION OF INFECTION OR EXECUTION OF VIRUSES AND MALWARE." The identified earlier-filed non-provisional and provisional patent applications are hereby incorporated by reference in their entirety into the present application.

BACKGROUND

1. Field

Embodiments of the present invention provide a computer program, a method, and a system for prevention of infection or execution of viruses and malware on a computing device. More particularly, embodiments of the present invention prohibit infection or execution of all new applications or processes while a protected mode of the computer program of the present invention is activated.

2. Related Art

Infection of a computing device by a virus or item of malware is a significant problem for many computer users. Malfeasants initiating the virus/malware are skilled at cloaking the virus as a legitimate application, such that many computer users unknowingly allow execution of the virus on the user's computing device. To combat this problem, there are many types of virus/malware prevention computer programs. A first type of program attempts to track each new virus/malware, compare an application to be executed against a list of known viruses and items of malware, and block any application that matches the listing of known viruses and malware. This method of virus prevention has many detractions, however. For example, literally multiple thousands of viruses are known on any given day, and every day more viruses are added to the "virus list." The upkeep of the virus list requires daily, if not hourly, monitoring and updating. Additionally, the processing time to compare an application attempting to execute on the user's computing device to the "virus list" is time consuming, as the list is usually very extensive. Thus, the processing time employed by the computing device's CPU and the memory and hard drive utilization are relatively larger for lengthy lists of viruses. Additionally, these virus prevention methods require scanning and filtering through numerous known viruses, which increases processing time and hard drive utilization.

A second type of virus/malware prevention approaches the problem by maintaining a whitelist of legitimate (i.e., non-virus) applications. Similar to the above example, any new application attempting to be executed is compared to the applications on the whitelist. If there is a match, then the application is allowed to execute. Although the whitelist of legitimate applications is not as numerous as the "virus list" described above, the whitelist is usually still several thousand applications, and more applications are routinely added. Because the whitelist is a universal whitelist for all computer users, if a particular computer user accesses a little known application, then the application may not be on the whitelist, even if it is legitimate. The user must then request the application be specifically executed via a series of advanced steps, and such selection of the advanced steps must be undertaken each time the application is accessed.

Accordingly, there is a need for a computer program, a method, and a system that prevents execution of a virus or item of malware quickly, without using significant computer resources, that is easy for the average computer user to use, and that is unobtrusive and does not interfere with the user's use of the computing device.

SUMMARY

Embodiments of the present invention solve the above-mentioned problems and provide a computer program, a method, and a system for prevention of infection or execution of viruses and malware on a computing device. Embodiments of the present invention advantageously kill, block, and deny from running or being executed unwanted or malicious computer code by having no exception to what applications may be executed while the computer program is in an activated protected mode. In particular, while the protected mode is activated, no application may be executed unless it is listed on an inventory recordation personal to the user, wherein the inventory recordation lists information uniquely identifying a plurality of legitimate applications.

The user may activate a training mode during which the user may train the computer program as to which legitimate applications the user routinely accesses. The computer program then compiles the inventory recordation that is personal to the user, as the inventory recordation lists applications accessed by the user during the training mode. Thus, the inventory recordation of embodiments of the present invention is not a universal whitelist intending to list all legitimate applications for all users, but is instead a listing of applications that are, at least in part, selected by each particular user and based off of and a result of the user's use of the computing device and accessed applications. Because the inventory recordation is personal to the user, the list of legitimate applications on the inventory recordation is substantially shorter than prior art "whitelisting" methods.

The computer program and method of embodiments of the present invention comprise the initial step of compiling the inventory recordation personal to the user by (1) receiving an instruction from the user to selectively activate the training mode, (2) receiving information identifying at least one application requested by the user to be executed by the computing device, and (3) updating the inventory recordation to include the information identifying the requested application, such that at least one application identified on the inventory recordation directly results from the user's instruction to execute the application during the training mode. After compiling the inventory recordation personal to the user, the computer program and method of embodiments of the present invention broadly comprise the steps of activating the protected mode, such that upon activation of the protected mode, the training mode is automatically deactivated; receiving, while the protected mode is activated, information indicative of an attempt by the user to execute an unconfirmed application, wherein the information indicative of an attempt by the user to execute an unconfirmed application includes information identifying the unconfirmed application; comparing the information identifying the unconfirmed application with information identifying the listing of applications on the inventory recordation that are approved for execution; identifying the unconfirmed application as an application approved for execution if the information identifying the unconfirmed application matches with information identifying an application on the inventory recordation; and identifying the unconfirmed application as an application not approved for execution if the information identifying the unconfirmed application does not match with information identifying an application on the inventory recordation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention provides various embodiments of a computer program, a method, and a virus and malware prevention system 10. The invention prevents execution of any application by an operating system of a computing device that is not identified on an inventory recordation listing legitimate applications. In embodiments of the present invention, at least a plurality of the applications identified on the inventory recordation is personal to either or both of the computing device or a logged user of the computing device, such as when the user gains access to the computing device via a username and password or other "logging in" or authentication feature. An "application" as used herein is defined as any process, program, or application that can be or is executed by the computing device, and similarly, reference herein to a "process" should be considered to include applications.

As detailed below, the computer program of embodiments of the present invention comprises a plurality of codes segments executable by the computing device for performing the steps of the method of the present invention. The steps of the method may be performed in the order shown in FIG. 2, or they may be performed in a different order. Furthermore, some steps may be performed concurrently as opposed to sequentially. Also, some steps may be optional.

The user of the present invention can selectively activate a program mode for desired operational features. The present invention includes at least two programs modes, namely a training mode and a protected mode, wherein there are two variations of the protected mode. In further embodiments of the present invention, a third program mode, referred to as an off mode, may also be activated by the user.

Depending on the activated program mode and/or also whether an application is on the inventory recordation, the computer program of the present invention either instructs the operating system to deny execution of the application or otherwise does not prevent or interfere with execution of the application. Thus, it should be understood and appreciated that the computer program does not actually execute any particular application; instead, the operating system of the computing device executes the application. Reference to the computer program of the present invention executing an application or allowing execution of an application is intended to encompass the computer program not instructing the operating system to terminate execution of a particular application.

The computer program and method of embodiments of the present invention comprise the initial step of compiling the inventory recordation personal to the user by (1) receiving an instruction from the user to selectively activate the training mode (2) receiving information identifying at least one application requested by the user to be executed by the computing device, and (3) updating the inventory recordation to include the information identifying the requested application, such that at least one application identified on the inventory recordation directly results from the user's instruction to execute the application during the training mode. After compiling the inventory recordation personal to the user, the computer program and method of embodiments of the present invention broadly comprise the steps of activating the protected mode, such that upon activation of the protected mode, the training mode is automatically deactivated; receiving, while the protected mode is activated, information indicative of an attempt by the user to execute an unconfirmed application, wherein the information indicative of an attempt by the user to execute an unconfirmed application includes information identifying the unconfirmed application; comparing the information identifying the unconfirmed application with information identifying the listing of applications on the inventory recordation that are approved for execution; identifying the unconfirmed application as an application approved for execution if the information identifying the unconfirmed application matches with information identifying an application on the inventory recordation; and identifying the unconfirmed application as an application not approved for execution if the information identifying the unconfirmed application does not match with information identifying an application on the inventory recordation.

Hardware Description

Figure 1:
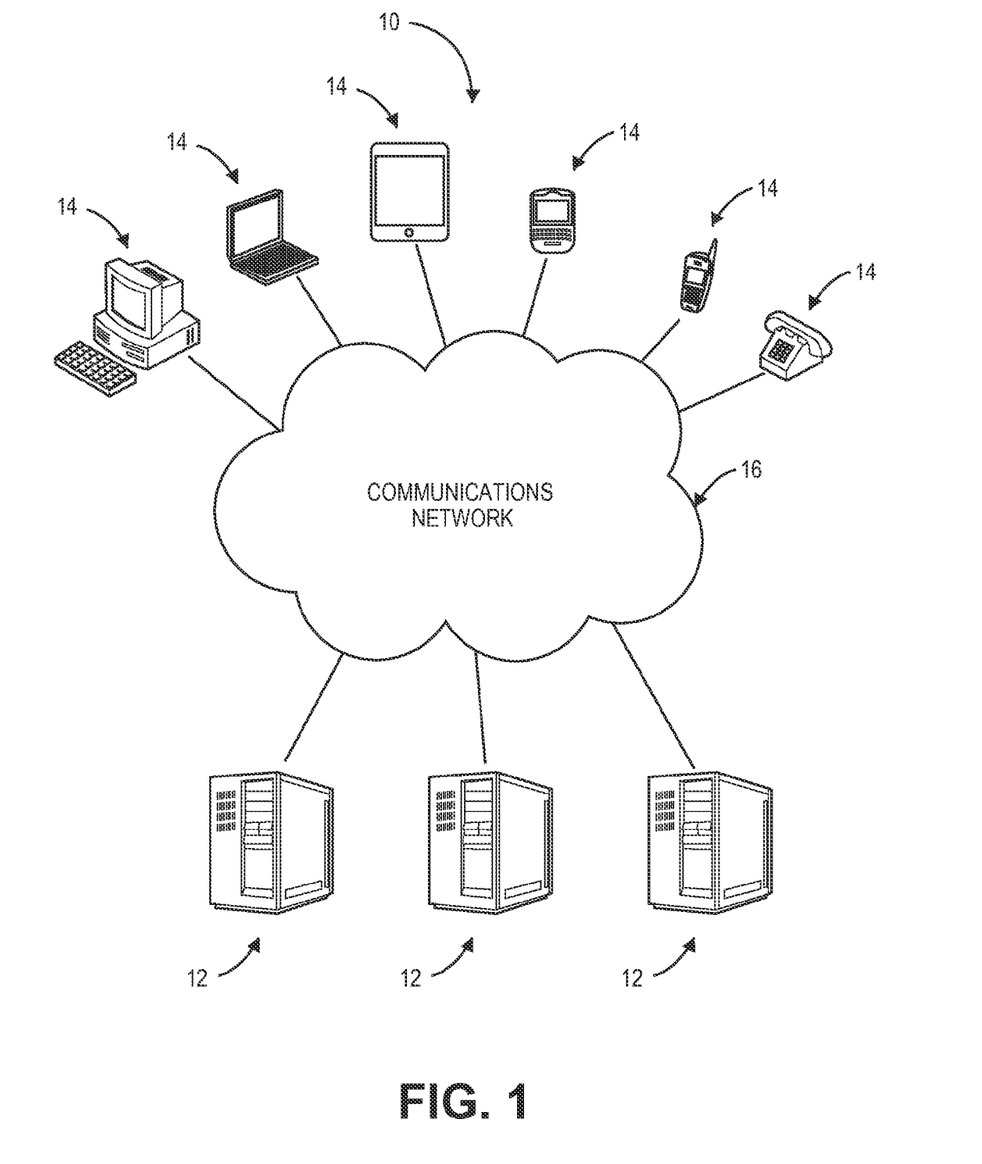
FIG. 1 is a schematic depiction of a system for prevention of execution of viruses and malware on a computing device constructed in accordance with various embodiments of the present invention.

The computer program and the method of embodiments of the present invention may be implemented in hardware, software, firmware, or combinations thereof using the virus and malware prevention system 10, shown in FIG. 1, which broadly comprises server devices 12, computing devices 14, and a communications network 16. The server devices 12 may include computing devices that provide access to one or more general computing resources, such as Internet services, electronic mail services, data transfer services, and the like. The server devices 12 may also provide access to databases storing each user's or computing device's inventory recordation. The computing device may include any device, component, or equipment with a processing element and associated memory elements. The processing element may implement operating systems, and may be capable of executing the computer program, which is also generally known as instructions, commands, software code, executables, applications, apps, and the like. The computer program may be multiplatform and may be installed on any computing device or processing element. The platforms include, but are not limited to: Microsoft Windows, Mac OS, Mac iOS (iPhone and iPad), Java ME, Linux, Google Android, Symbian, BlackBerry, Windows Mobile, Playstation, BREW, FreeBSD, Nintendo Wii, SunOS, Nintendo DS, Palm, Web TV, OpenBSD, NetBSD, AIX, SCP, HP-UX, OpenVMS, and SCO.

The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, the server devices 12 may further include file stores comprising a plurality of hard disk drives, network attached storage, or a separate storage network.

The computing devices 14 may include work stations, desktop computers, laptop computers, palmtop computers, tablet computers, portable digital assistants (PDA), smart phones, and the like, or combinations thereof. Various embodiments of the computing device 14 may also include voice communication devices, such as cell phones or landline phones.

The communications network 16 may be wired or wireless and may include servers, routers, switches, wireless receivers and transmitters, and the like, as well as electrically conductive cables or optical cables. The communications network 16 may also include local, metro, or wide area networks, as well as the Internet, or other cloud networks. Furthermore, the communications network 16 may include cellular or mobile phone networks, as well as landline phone networks or public switched telephone networks.

Both the server devices 12 and the computing devices 14 may be connected to the communications network 16. Server devices 12 may be able to communicate with other server devices 12 or computing devices 14 through the communications network 16. Likewise, computing devices 14 may be able to communicate with other computing devices 14 or server devices 12 through the communications network 16. The connection to the communications network 16 may be wired or wireless. Thus, the server devices 12 and the computing devices 14 may include the appropriate components to establish a wired or a wireless connection.

The computer program of the present invention may run on the computing device or, alternatively, may run on one or more server devices 12. Thus, a first portion of the program, code, or instructions may execute on a first server device 12 or the computing device 14, while a second portion of the program, code, or instructions may execute on a second server device 12 or the computing device 14. In some embodiments, other portions of the program, code, or instructions may execute on other server devices 12 as well. For example, the database of inventory recordations may be stored on a memory element associated with the server device 12, such that the inventory recordation for each user is remotely accessible for each use of the computer program (e.g., stored in the "cloud"). Alternatively, each inventory recordation may be stored on the memory element associated with the respective computing device for the inventory recordation. In embodiments where the inventory recordations are stored remotely, the user may authenticate their identity at various computing devices while still accessing and relying on the same inventory recordation personal to the user.

Inventory Recordation

When activated and enabled on a computer, the software instantly captures and records an inventory recordation, also referred to herein as a "snapshot," of any and all computer processes or applications that are currently running on the computer (regardless of whether the process is minimized, i.e., out of focus of the user, or maximized, i.e., in focus of the user). The present invention kills, blocks, denies execution of, or otherwise instructs the operating system to terminate execution of any application or process not listed on the inventory recordation. It should be appreciated that "activation" of the software, as used herein, is not intended to equate to only installation or downloading of the software. Instead, the software may toggle between "activation," where the software is performing the blocking feature described herein, and "deactivation," where the software is running but is deactivated and not performing the blocking feature.

Each time the software is activated, a new inventory recordation of the open processes or applications is performed and is merged, without duplication, with the prior inventory recordation. Thus, each inventory recordation that is performed is combined with previously-performed inventory recordations to create a cumulative inventory recordation. Therefore, when performing the blocking function described herein, the software compares the process or application that is attempting to be executed (herein the "attempted process") with the processes and applications in the cumulative inventory recordation, i.e., the aggregate of the previous inventory recordations taken. If the attempted process does not match a process or application in the cumulative inventory recordation, then the attempted process is blocked, killed, or otherwise denied from running. In embodiments of the present invention, comparison of the processes or applications is performed, for example, by comparing the path and file name of the attempted process to the paths and file names included in the cumulative inventory recordation. Other parameters, properties, or techniques for comparison of the process or application attempting to be performed to those processes or applications stored in the cumulative inventory recordation can also be used.

The inventory recordation is personal to the user, in that at least a plurality of the applications listed on the inventory recordation was added while the program was in the training mode and was added in response to the user's attempt to execute the application in the training mode. Thus, the inventory recordation is not a universal whitelist that is used for comparison/matching of applications for all computing devices and/or all users. Instead, the inventory recordation is specific to the particular computing device. Alternatively, as in an enterprise situation, the user may log on or otherwise authenticate their identity, and then the inventory recordation may be specific to the authenticated user, as opposed to the computing device. Reference to the inventory recordation being personal to the user encompasses both of the scenarios discussed above.

Figure 3:
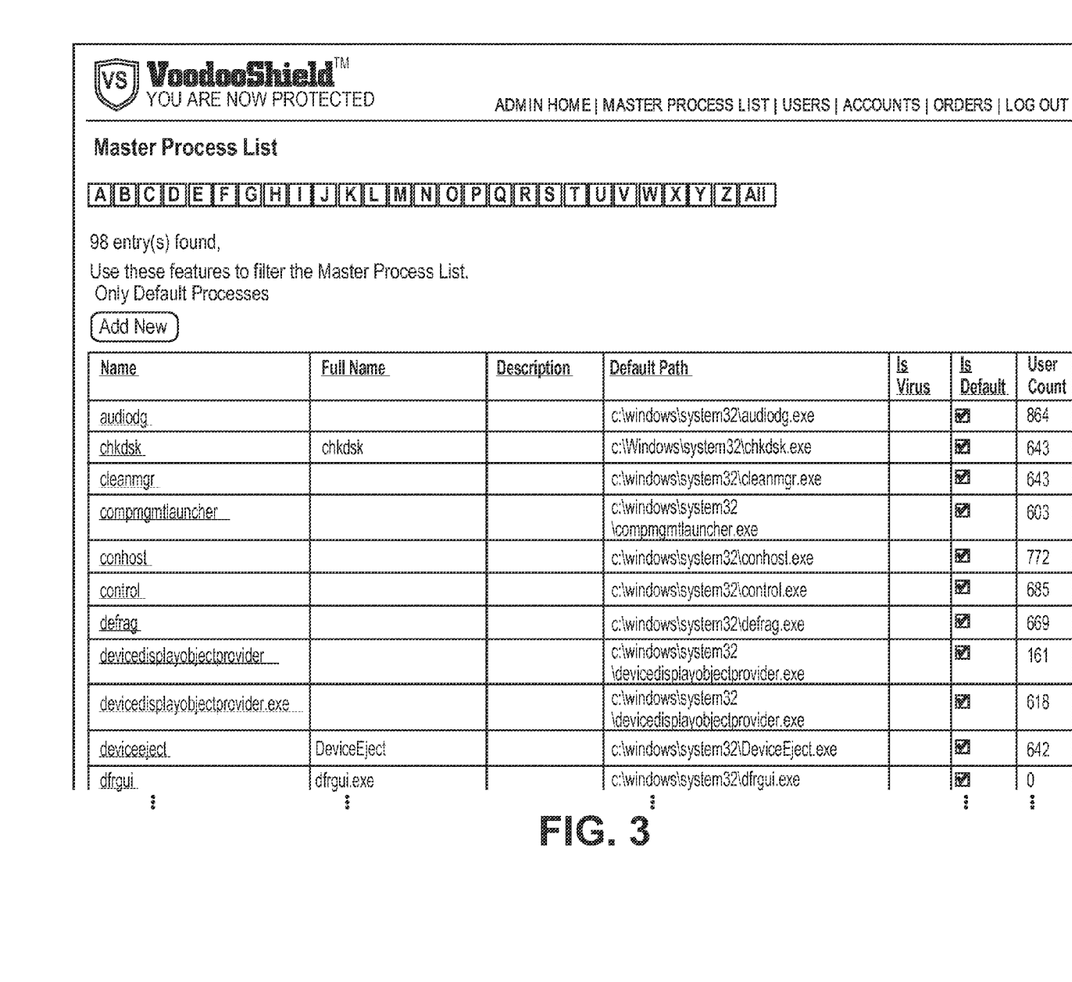
FIG. 3 is a first screen capture of the computer program of embodiments of the present invention and illustrating an inventory recordation and, in particular, exemplary administrator applications.

Referring to FIG. 3, the inventory recordation is an inventory or listing of applications, including information uniquely identifying each application. Although varying information may be used to identify the application, in embodiments of the present invention, the pathname for the particular application is used, at the least, to uniquely identify the application. A name for the application may also be used. As an example, Internet Explorer™ is a commonly-used Internet browser with the pathname C:\Program Files\Internet Explorer\iexplore.exe (unless the file explorer.exe is otherwise moved to a different folder by the user of the computing device). The information on the inventory recordation identifying the Internet Explorer™ application is, at the least, the pathname, and this is the information that is used to compare a yet-to-be-approved application that the user is attempting to execute while in the protected mode. The pathname is unique for the particular application, in that two different applications cannot have the same pathname.

As is known in the art, the majority of viruses or malware download to a computing device through a temporary internet file ("TIF"). The folder a particular TIF is assigned to by the operating system is random, such that the pathname assigned to the TIF is random. Therefore, it is statistically highly unlikely that a malfeasant attempting to execute a virus or item of malware on a computing device would be able to guess the pathname assigned by the operating system to the TIF containing the virus/malware. This is especially accurate given that the pathname includes the user profile name (or, as sometimes the case, the computing device's name) in the pathname. Thus, the malfeasant would also need to target a particular user to even have the user profile name correct in the pathname. As most viruses and malware are deployed en masse in large numbers by the malfeasant, and are not otherwise targeted to particular users, the likelihood that the malfeasant would know the user profile name and be able to include in the pathname for the TIF containing the virus/malware is extremely low.

Even for viruses that do not enter through a TIF, embodiments of the present invention perform substantially the same by listing unique identifying information, such as the pathname, for the application on the inventory recordation. For example, if a virus that did not download as a TIF but was otherwise named with an authentic application's pathname, such as Internet Explorer™, then execution of Internet Explorer™ using the pathname C:\Program Files\Internet Explorer\iexplore.exe would not execute the authentic application. Therefore, the virus/malware would be very evident to the user. More importantly, it is generally difficult to spoof an authentic pathname for an application, which is why the vast majority of viruses are downloaded to the computing device via the TIF.

It should be appreciated that plug-ins and add-ons often used during web browsing, such as, for example, Java™, Flash™, ActiveX™, etc., are not applications executed by the operating system of the computing device but are instead embedded in the Internet browser application. Therefore, while the user is accessing an Internet browser, any plug-ins or add-ons that attempt to be executed will not be blocked by the computer program of the present invention. However, in the event the plug-in or add-on contains a virus or item of malware, upon the virus/malware attempting to execute as an independent application, the computer program will block said virus or malware if the protected mode is activated. Therefore, use of the present invention does not negatively affect the user's web browsing experience.

In embodiments of the present invention, at least one and preferably a plurality of the applications listed on the inventory recordation are listed by an administrator of the computer program and not as a result of the user attempting to execute the application during the training mode. In essence, an established or safe applications list is prepared that contains the information associated with non-virus or non-malware applications and processes that may be used by the computer user. Exemplary programs that are commonly used during computer use and that are included on the established applications list include, without limitation, printing and audio drivers, volume control, remote desktop client, the user control panel, the task manager, backup, Java, and other like programs. The initial inventory recordation accessed by the program of the present invention upon the user's first use of the program includes the applications and processes in the established applications list. Thus, as the user continually accesses programs through use of their computer, and those programs are added to the cumulative inventory recordation, the programs or applications in the established applications list are also included in the cumulative inventory recordation. In particular, there are many applications that the user executes without realizing that the application is even executing. For example, mmc.exe assists with managing plug-ins. Execution of the application by the user is likely unknown to most users. Other exemplary applications that may be listed as an administrator application include, without limitation, printing and audio drivers, volume control, remote desktop client, the user control panel, the task manager, backup applications, and other like applications. To address these less obvious applications executed by the operating system on a regular basis, embodiments of the present invention compile a list of unique identifying information for the administrator applications. In embodiments of the present invention, the listing of administrator applications is less than two hundred, less than one hundred fifty, or less than one hundred applications. Thus, the list of administrator applications is not a universal list of all potential authentic applications that could be executed by any user but rather the discrete list of applications required for efficient operation of the operating system. Notably, and as discussed in below, the computer program updates the inventory recordation to include the listing of applications accessed by the user during the training mode. It is to be noted that although the established applications list is used as part of the cumulative inventory recordation, the particular programs accessed by the user are also cumulatively added to the cumulative inventory recordation. Therefore, the present invention appreciates that there are programs that many computer users do not realize they use, such as a print execution program, but there are other programs that the particular user may access that are not otherwise on the established applications list. The purpose of such is to maintain a relatively small cumulative inventory recordation for each user that is specific to the user. This prevents reliance on a "whitelist" of all possible valid programs on which viruses or malware can inadvertently be added. Additionally, the computer program of embodiments of the present invention need only cross-reference the programs listed in the cumulative inventory recordation, and because it is a relatively small list particular to the user (except for the even smaller list of established applications), the cross-referencing performed by the computer program of the present invention is significantly faster than prior art anti-virus or malware programs.

As noted above, the inventory recordation may be stored locally or remotely, but in embodiments, the inventory recordation is stored remotely so as to allow access by the user via multiple computing devices and to prevent hacking or other malicious access of the inventory recordation. In particular, when the computer program of the present invention is executed during a particular use time, the inventory recordation is stored locally on the computing device. When the user exits or closes the computer program of the present invention, or the program is otherwise exited due to computing device inactivity by the user, the inventory recordation is uploaded to a remote site. When the computer program is again re-executed or the computing device is booted, the inventory recordation that is stored remotely is downloaded to the computing device. In alternative embodiments, the inventory recordation can be uploaded to the remote storage site more or less frequently, and the frequency of uploading can be user-selected.

In sum, embodiments of the present invention advantageously kill, block, and deny from running, or being executed, unwanted or malicious computer code by having no exception to what applications may be executed while the software is activated. Alternatively stated, while the software is running, no application may be executed unless it is within the cumulative inventory recordation. Traditional antivirus software or computer firewalls include the ability of the user to grant exceptions to certain applications, thereby allowing said accepted applications to always run or be executed. Embodiments of the present invention do not allow for exceptions in any form or fashion if not otherwise listed in the cumulative inventory recordation, which eliminates the risk of exposure to malicious computer code that might be present in the application exceptions.

In embodiments of the present invention, the inventory recordation is also password protected or requires some form of authentication to access it. This prevents a hacker from easily accessing the inventory recordation and modifying it to include pathnames corresponding to viruses or malware.

Figure 7:
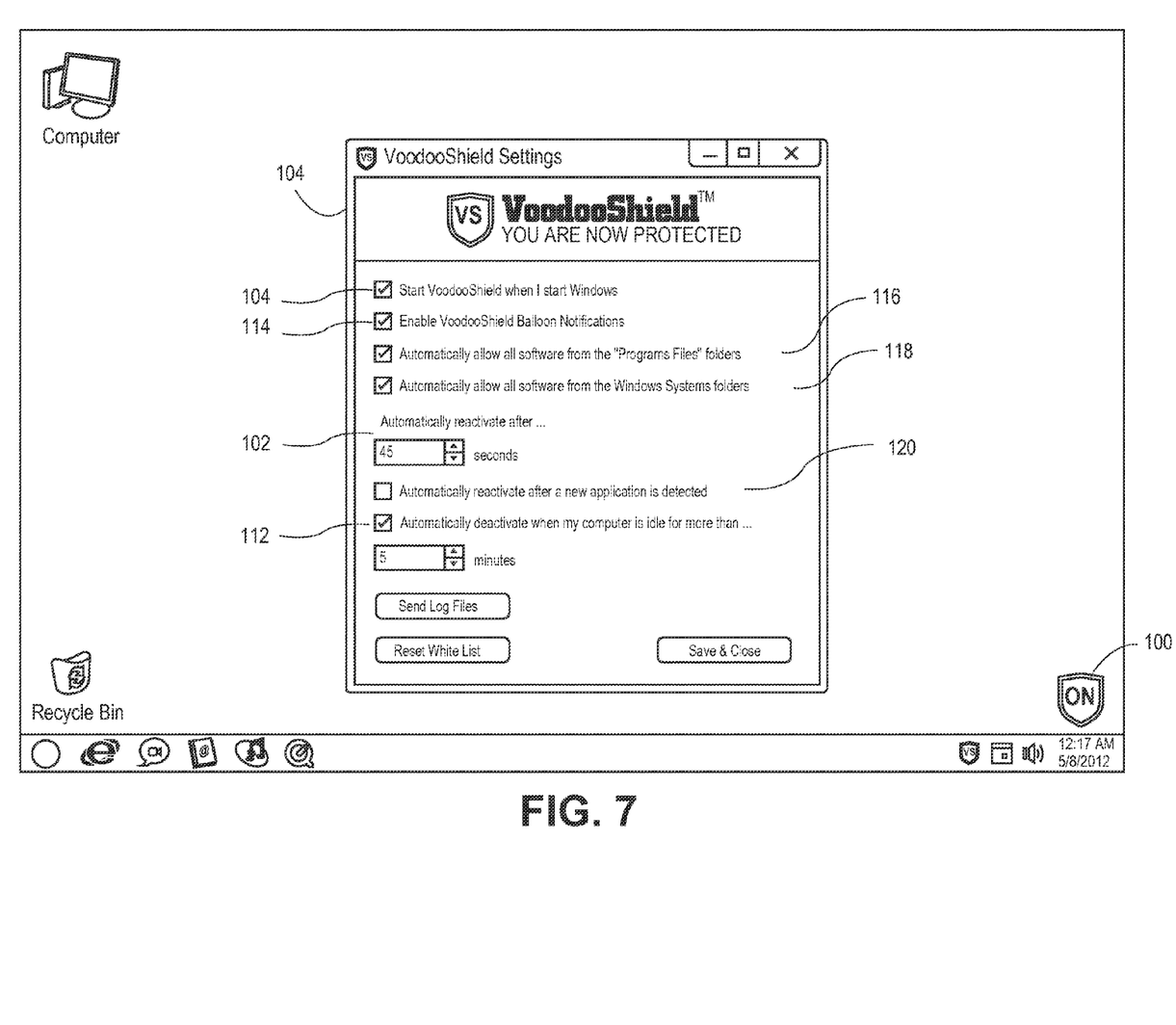
FIG. 7 is a fifth screen capture of the computer program of embodiments of the present invention and illustrating a user option menu providing a plurality of user-selectable options for the operations of the computer program.

As illustrated in FIG. 7 at 116, the user may select to automatically allow all applications in the "Programs Files" folders to be added to the inventory recordation. Additionally, as illustrated at 118 in FIG. 7, the user may select to automatically allow all applications in the Windows Systems folders to be added to the inventory recordation.

Training Mode

While in the training mode, the computer program of the present invention executes any application instructed by the user and regardless of whether the inventory recordation comprises information uniquely identifying the application. The computer program does not match or compare the identifying information for the application to be executed against the identifying information for the applications listed on the inventory recordation for the respective user. Thus, while in the training mode, the computing device is susceptible to downloading and executing a virus or item of malware.

The user must train the computer program on what applications the user desires to permanently be executable by the operating system. If the user has not trained the computer program to include a particular application, and the application is not otherwise one of the discrete administrator applications, then while in the protected mode, attempted execution of the application will be terminated.

Figure 2:
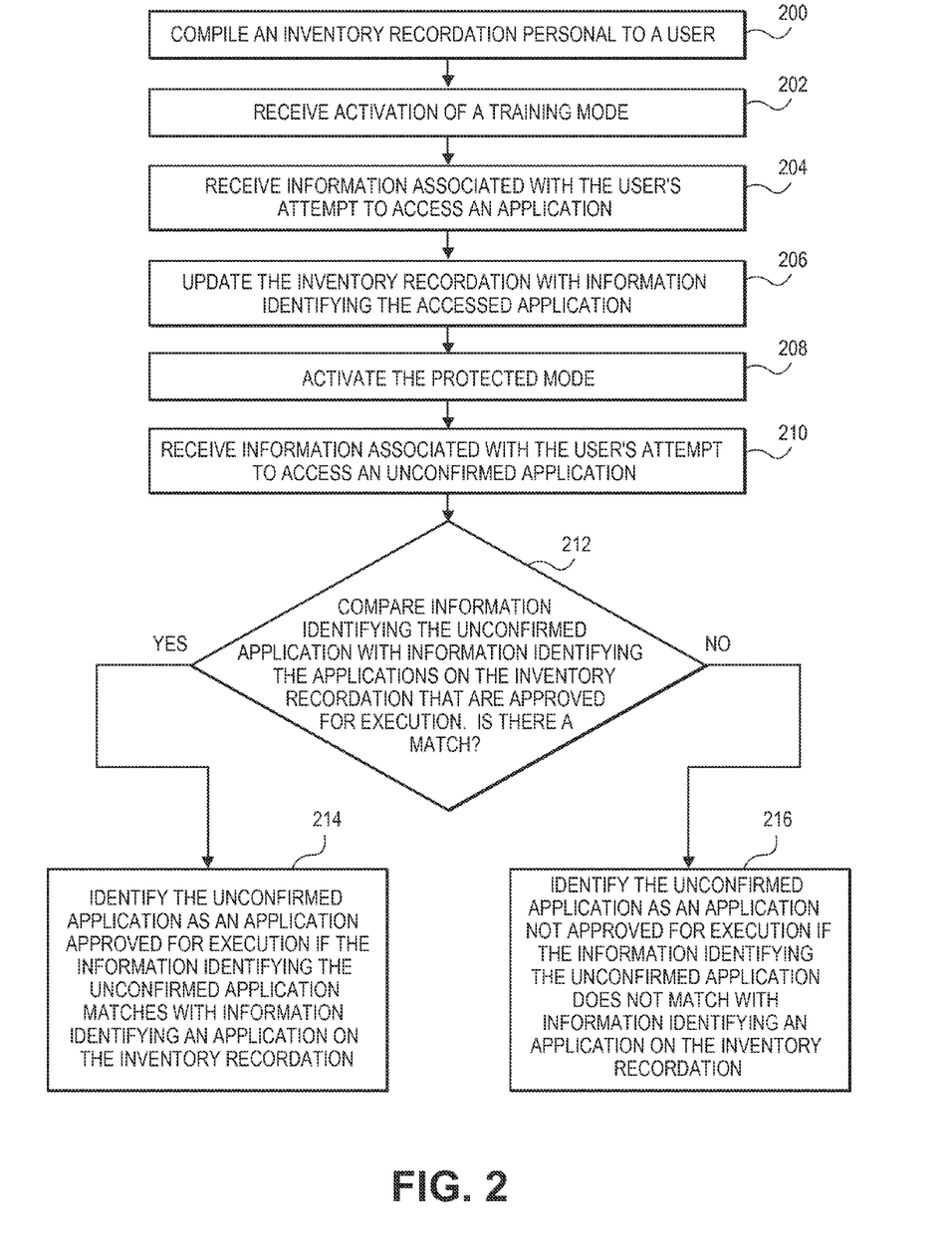
FIG. 2 is a flow chart of a method of prevention of execution of viruses and malware on a computing device.
Figure 4:
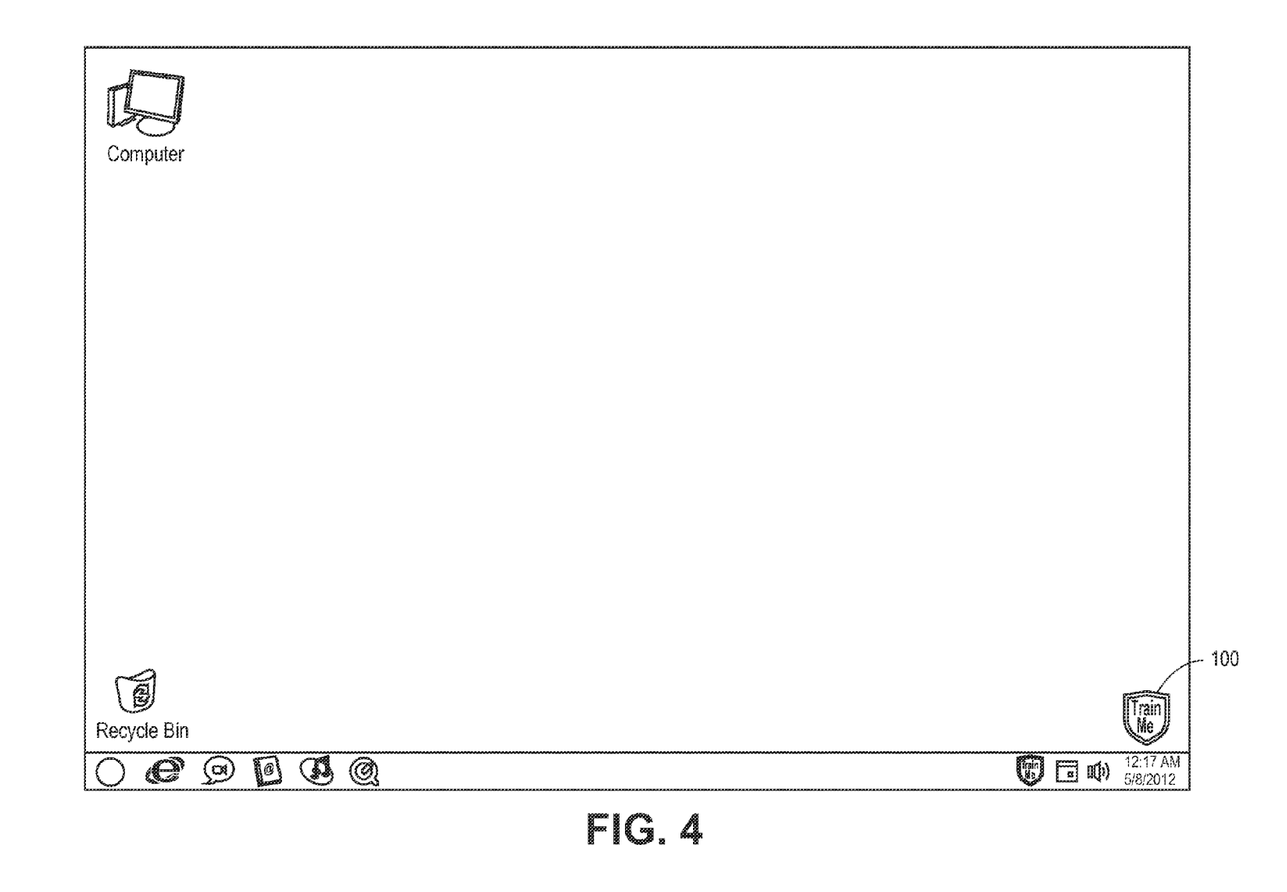
FIG. 4 is a second screen capture of the computer program of embodiments of the present invention and illustrating the computer program in a training mode.

The training of the computer program is the initial step of compiling the inventory recordation personal to the user, as illustrated in Step 200 of FIG. 2. As illustrated in FIG. 4, the user first selectively activates the training mode, Step 202, using a computer user interface 100 of the present invention detailed below and hereinafter referred to as a "smart icon." Activation of the training mode requires affirmative user selection, which is in contrast to activation of the protected mode as detailed below.

Upon the training mode being activated, the user accesses each of the applications the user normally uses, such as Microsoft Word™, Adobe™, etc., as shown in Step 204. Because the training mode is activated, each accessed application will be executed by the operating system. Additionally, the inventory recordation personal to the user is updated to include information uniquely identifying the accessed application, such as the pathname for the application, as shown in Step 206. Once the inventory recordation is updated to include the accessed application, the computing device will execute the application at any time and regardless of the activated program mode. Notably, the computing device will execute the application while in the protected mode because the pathname for the application will be on the inventory recordation and there will be a successful match, as discussed in detail below.

Should the pathname for the application change in the future due to an update or being moved on the computing device's operating system, then this will prevent execution of the application while in the protected mode. This is because the new pathname attempting to be executed while in protected mode is not on the inventory recordation. To remedy this, the user will activate the training mode using the smart icon and then select the application for execution. Upon execution of the application in the training mode, the inventory recordation will be updated to include the new pathname for the application.

Protected Mode

Figure 5:
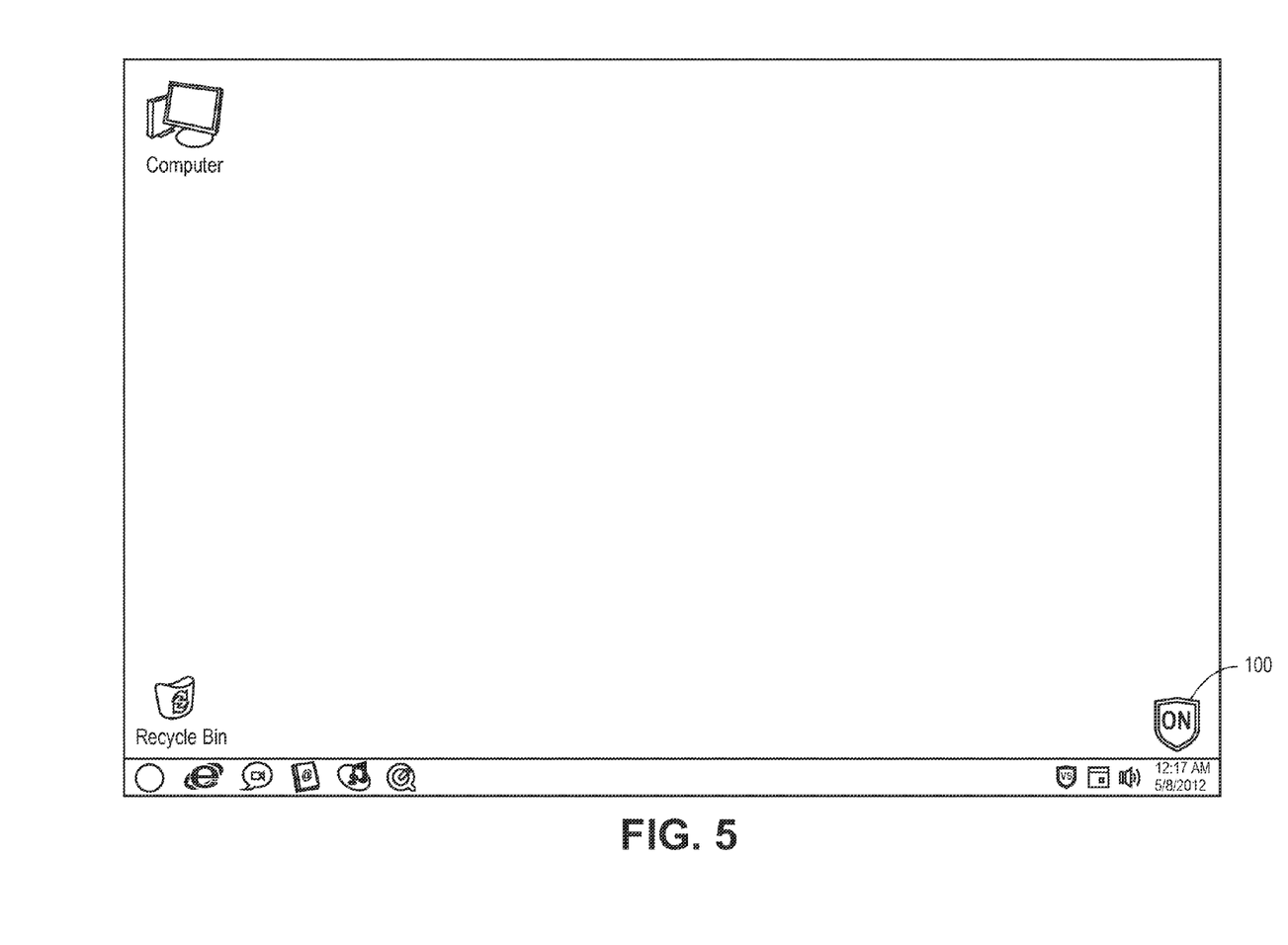
FIG. 5 is a third screen capture of the computer program of embodiments of the present invention and illustrating the computer program in a protected mode (indicated as "ON")
Figure 6:
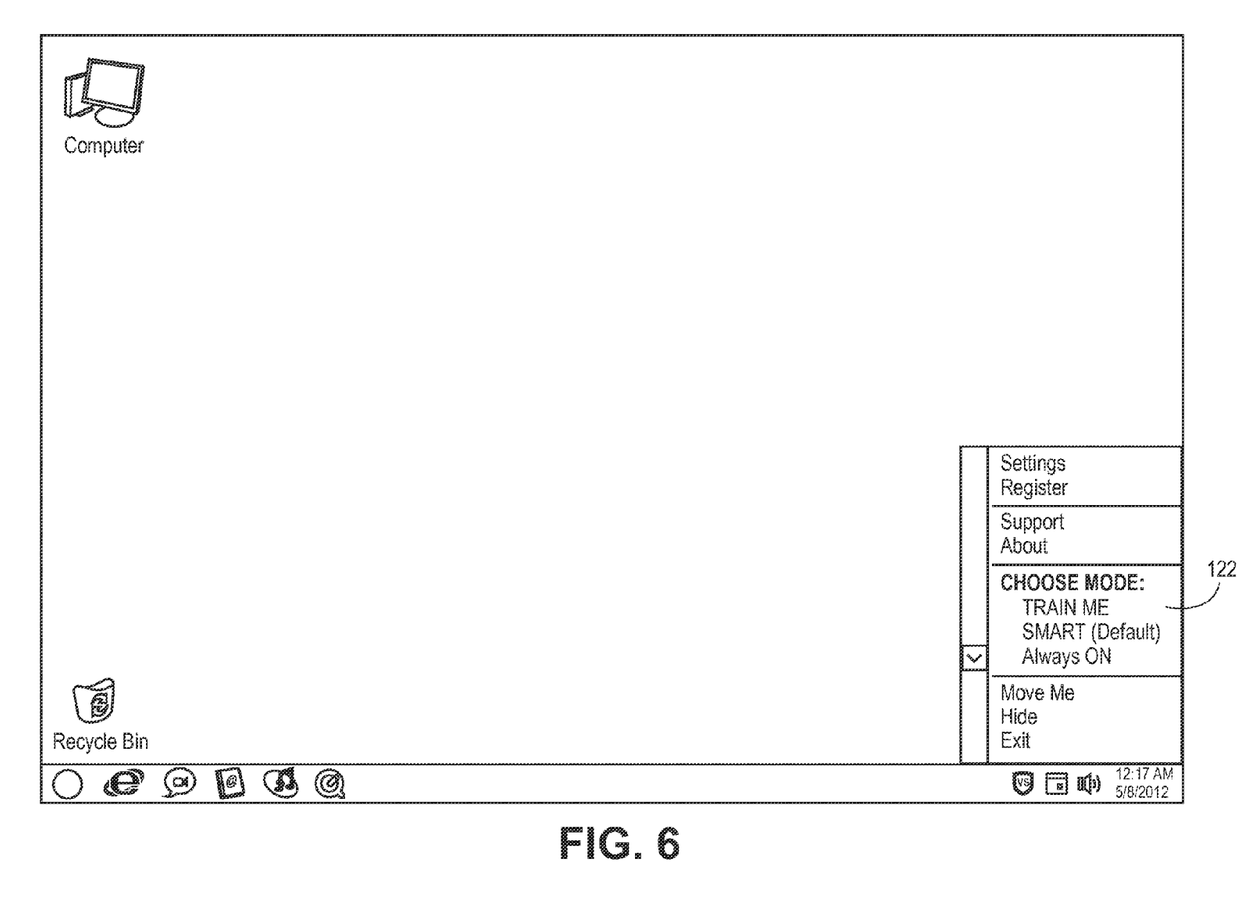
FIG. 6 is a fourth screen capture of the computer program of embodiments of the present invention and illustrating a menu of user-selectable operations for instructing the computer program.

After the user has trained the computer program of the present invention on the common applications accessed by the user so that the inventory recordation personal to the user is compiled, the protected mode is activated or "ON", as shown in Step 208 and illustrated in FIG. 5. Embodiments of the present invention contemplate two variations of the protected mode, namely a "Smart" mode and an "Always On" mode, as illustrated in FIG. 6. Although both variations of the protected mode are discussed below in detail, for ease of reference, the following is a brief discussion.

In the "Smart" protected mode, the computer program toggles between monitoring and not monitoring what applications the user requests to be executed depending on whether the user executes an application that presents a risk for further execution of a virus or item of malware (also referred to as "virus source applications"), such as an Internet browser or e-mail client application. If the at-risk application is executed, then the application monitoring and blocking features are activated. In contrast, if the user is not running an application that presents a risk for execution of a virus (for example, the user is running Microsoft Word™), then the application monitoring and blocking features are not activated.

Should the user forget to activate the software, embodiments of the present invention may automatically activate the software upon execution of virus source applications, as described above. It should be appreciated that the virus source applications or processes that automatically activate the software, i.e., that act as an initiator of the software, may include additional processes than described above, and reference to web browsers or e-mail clients is not intended to be limiting.

As is known, minimized applications that are not in focus by the user but are still running on the user's computer can still be a source of viruses. This is because, for example, a website can install viruses at any time while the application is running on the computer. The present invention recognizes this weakness and activates, or, as the case may be, maintains activation of the software even when a web browser or e-mail client is minimized or otherwise out of focus. Thus, the default performance mode for the software is that the software does not automatically deactivate until all virus source applications, such as the web browsers and e-mail clients, are closed (as opposed to merely minimizing). Should the user close the browser or e-mail client, such that no virus source applications are running, then the software will automatically deactivate. Should the user manually deactivate the software to start or open an application that is not a virus source application, such as Microsoft Word, then the software will remain inactive until the user chooses to reactivate it or until the software detects opening or running of a virus source application.

In even further alternative embodiments, the software may include a user-selected preference that is recommended for advanced users. In this preference, the software automatically deactivates when a non-virus source application, such as Microsoft Word, gains focus or is otherwise maximized. The software is reactivated when a virus source application gains focus. Therefore, unlike the default preference wherein the software is activated when the virus source application is running, regardless of whether the virus source application is minimized or maximized, the user-selected advance preference only activates the software when a virus source application gains focus. Although this preference does provide a slightly higher exposure to viruses due to viruses being able to infiltrate a computer system even when the Internet or a website is not actively being accessed, the user-selected advanced preference provides a more streamlined user experience. Because the risk of a virus from a non-active website is relatively low, the user may desire this preference.

The "Always On" mode does not toggle between monitoring and not monitoring the applications executed by the user. Instead, the application monitoring and blocking features are always activated when in the "Always On" mode, regardless of whether the user activates an application that presents a risk for infection of a virus or item of malware.

In embodiments of the present invention, the "Smart" mode is the default protected mode that is activated after the training mode discussed above is completed. The user may manually select the "Always On" mode should the user desire to maintain the application monitoring and blocking features at all times (except, of course, when the training mode is otherwise activated). It is contemplated that the "Always On" mode is best used once the computer program of the present invention is well trained, that is once the user has compiled the inventory recordation personal to the user over an extended period of time, such that new applications to add to the inventory recordation are rare. In alternative embodiments of the present invention, the user may select which of the two variations of the protected mode the user desires to automatically activate upon deactivation of the training mode.

The protected mode may be activated one of several different methods. It should be understood that because the protected mode is either of the two variations discussed above, namely the "Smart" mode and the "Always On" mode, activation of the protected mode activates one of these two variations, depending on either the default or user-selected preferences. In a first method, the protected mode is automatically activated by the computer program of the present invention after an elapsed period of time 102, as shown in the user-selected settings box 104 of FIG. 7. In particular, while in the training mode, the program monitors the period of time the training mode is activated or some other period of time, such as the time from the when the user last accessed and executed an application. After a pre-set period of time has elapsed, the computer program automatically deactivates the training mode and activates the protected mode without requiring the user to affirmatively activate the protected mode. The advantage of the automatic activation of the protected mode is that the user does not need to remember to activate the protected mode. In embodiments of the present invention, a default pre-set period of time 102 may be used or the user may have the option of selecting another pre-set period of time. Exemplary pre-set periods of time are thirty seconds, forty-five seconds, one minute, three minutes, five minutes, or ten minutes.

In a second method of activation of the protected mode, after the pre-set period of time has elapsed, the computer program presents an interface to the user requesting if the user is finished with training the computer program. An exemplary user interface is a balloon or other pop-up requesting the user to confirm that the user is finished training the program. If the user selects in the affirmative or "yes, I am finished training the computer program," then the computer program automatically activates the program mode. If the user selects in the negative or "no, I am not finished training the computer program," then the computer program begins anew monitoring an elapsed period of time.

In a third method of activation of the protected mode, the user can manually activate the protected mode via the smart icon 100. In a fourth method, the protected mode is automatically activated after a new application is detected, as illustrated at 120 in FIG. 7. In this fourth method, when the user trains the computer program to add a new application to the inventory recordation, the protected mode is automatically activated after the new application is added. In a fifth method, the computer program can automatically monitor for the presence of Internet activity and automatically activate the protected mode upon detection of said Internet activity. Other methods of activation of the protected mode could also be employed by the computer program.

Figure 8:
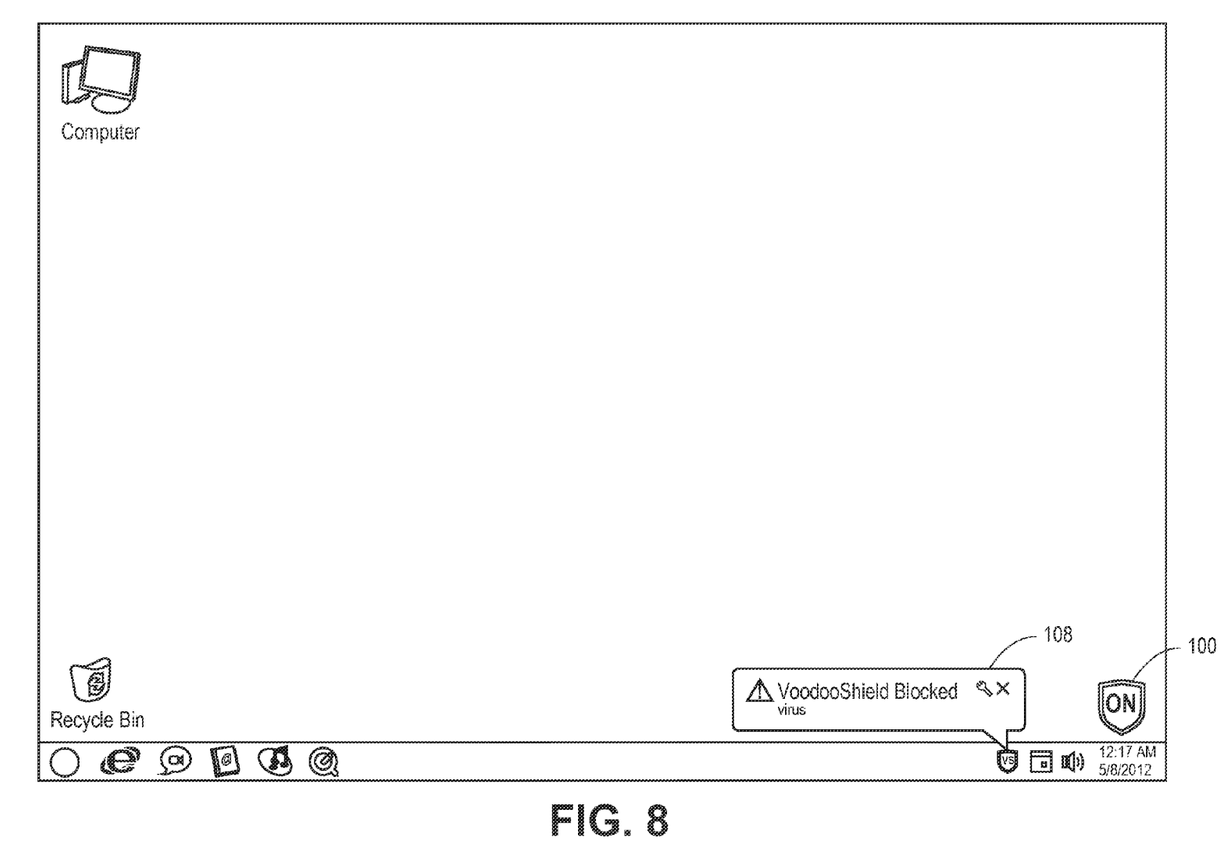
FIG. 8 is a sixth screen capture of the computer program of embodiments of the present invention and illustrating a notification by the computer program of the blocking of an application attempted to be executed by the user.

As can be appreciated, most of the use time of the computing device will be while the protected mode is activated. In this mode, the user's ability to execute a virus or item of malware is significantly diminished, if not completely removed. When the "Always On" variation of the protected mode is activated, any application that the user attempts to execute is monitored and compared to the inventory recordation personal to the user. When the "Smart" variation of the protected mode is activated, any application that the user attempts to execute, while an at-risk application is running, is monitored and compared to the inventory recordation personal to the user. For both variations of the protected mode, if the application's unique identifying information is not listed on the inventory recordation, then the computer program of the present invention instructs the operating system to terminate execution of the application, as illustrated in FIG. 8.

In more detail and as illustrated at Step 210, the computer program receives the user's instruction to activate a yet-to-be-approved application, hereinafter referred to as an "unconfirmed application." The computer program also receives information uniquely identifying the unconfirmed application, such as the application's pathname. The computer program compares the information uniquely identifying the unconfirmed application with the information uniquely identifying the plurality of applications listed on the inventor recordation personal to the user, as shown in Step 212. If the information for the unconfirmed application matches information for an application listed on the inventory recordation, then the application attempting to be executed is approved for execution, as shown in Step 214. In such a case, the computer program allows the application to execute or otherwise does not interfere with or prevent the operating system's execution of the application, such as by instructing the operating system to terminate execution of the application. However, if the information identifying the application attempting to be executed does not match with information for an application listed on the inventory recordation, then execution of the application is prevented, as shown in Step 216 and illustrated in FIG. 8. In particular, the computer program of the present invention instructs the operating system to terminate execution of the application or otherwise prevent execution of the application by the computing device. In embodiments of the present invention, if the computer program instructs termination of the application, the computer program will present a message, such as in the form of a pop-up or balloon notification 106 in FIG. 8 that informs the user that the application's execution was terminated. Alternatively or in addition, the smart icon may simply flash or briefly change colors to notify the user of the blocked application. If the user was attempting to execute what the user knew to be a legitimate application, this then informs the user that the inventory recordation needs to be updated. The user then activates the training mode via the smart icon and executes the application in the training mode to effectuate updating of the inventory recordation.

Embodiments of the present invention have the advantage of not requiring the user to respond to a prompt or request instructing whether an application should be executed or not. For example, prior art virus/malware prevention programs frequently operate by identifying a potentially suspicious application and then presenting to the user a prompt requesting the user to confirm or not confirm that the application should be executed. This methodology for preventing virus/malware execution fails for at least two reasons. First, many legitimate applications are identified by the computer program as being suspicious, which results in a large percentage of false positives. This large percentage of false positives then reduces user awareness of what could or could not be a virus or item of malware. Moreover, this requires the user to know, or at the least investigate, whether the application attempting to be executed and for which the user received the prompt is a legitimate application. Many computer users will not have the sophistication or knowledge to accurately confirm the legitimacy of the application.

Second, because many virus/malware prevention programs operate by presenting a prompt or request to the user to approve execution of the application, malfeasants know this and have mimicked the prompt or request interface of legitimate virus and malware prevention programs. Although there are many versions of mimicking a legitimate program, a common prompt is to ask the user if it would like a particular application (one that is often well known, such as JAVA™) to be updated. If the user confirms the update (or sometimes even if the user only selects any input on the prompt), the application containing the virus is executed. Embodiments of the present invention, upon receiving the user's selection to update the mimicked legitimate application, compare the pathname of the application to the inventory recordation to determine if the application is authentic and is approved for execution by the operating system.

As noted above, once an application is executed by the user in the training mode, such that the application is listed on the inventory recordation, there may be a circumstance where the application is updated by an administrator or source of the application. Most application updates do not result in the application being assigned a different pathname. However, it is foreseeable that some updated applications will be assigned a new pathname, such as if a major update is made or if a new version of the application is issued. In these instances, the pathname or other unique identifying information associated with the updated application will be changed from the prior version of the application, and as such, the unique identifying information for the application will not be listed on the user's inventory recordation. This will be evident to the user, as execution of the application while in the protected mode will be terminated.

Because the application is now identified with different unique information, the computer program of the present invention terminates execution of the application because it does not match identifying information on the inventory recordation. As described above, the user is notified that execution of the application was terminated. Because the notification is provided close in time and immediately in response to the user's attempt to execute the application, the user knows that the application information needs to be updated on the inventory recordation. The user will then activate the training mode and execute the application in the training mode, as described above.

"Smart" and "Always On" Variations of the Protected Mode

As noted above, the initially default to the "Smart" protected mode as the preferred variation of the protected mode of embodiments of the present invention. In the Smart mode, the computer program monitors what applications the user requests to be executed. If the user executes an application that presents a risk for further execution of a virus or item of malware, such as an Internet browser application, then the application blocking features described above for the protected mode are activated. For example, the computer program would allow execution of the Internet browser application because it is listed on the inventory recordation. Because the browser is open on the computing device, the risk for executing a virus is significantly increased. Therefore, the Smart protected mode compares each new application to be executed against the inventory recordation, but this application monitoring and blocking feature is only activated when an at-risk application is running. In contrast, if the user is working on the computing device and executes an application that is not a risk for downloading and executing a virus or item of malware, such as Microsoft Word™, then the application execution features described above for the training mode are activated, wherein each new application to be executed is not compared to the inventory recordation.

Thus, the Smart program mode toggles between a first sub-mode wherein the computer program is comparing the applications requested for execution to the inventory recordation, and a second sub-mode, wherein the computer program is not comparing the accessed applications to the inventory recordation. Upon the user attempting to execute applications known to be a source for downloading and executing viruses, the Smart protected mode toggles to the first sub-mode, wherein all applications attempted to be executed are compared to the inventory recordation for the user. Exemplary applications known to be a source of viruses are Internet browsers and e-mail clients. However, all system or user installed software that communicates with the Internet (hereinafter also referred to as "network-applications"), and thereby is subject to inherent exposure to malicious computer code, may automatically activate and enable the software. On the other hand, system and user installed software that does not communicate with the Internet, and therefore, is not subject to inherent exposure, does not necessarily activate and enable the software. It is to be appreciated that the Internet browser itself is not a source of viruses, but because the Internet browser is used to access data and potentially other applications, the execution of the Internet browser is a signal to the computer program to toggle the Smart protected mode to the first sub-mode of comparing all applications to be executed to the inventory recordation and terminating execution if not listed thereon.

In the second sub-mode where all applications are executed regardless if listed on the inventory recordation, the computer program may either update the inventory recordation to include the accessed application, similar to the training mode described above, or may simply allow execution of the application without updating the inventory recordation. In further alternatives, the user may select which of these two options the user desires the computer program to perform.

In alternative embodiments, activation of the first sub-mode of the Smart protected mode further comprises comparing each application that is executed and updating the inventory recordation with any newly-executed applications to the extent that an application is not a risk for a virus. However, upon executing an application that places the computer at risk for a virus, the Smart protected mode toggles to the second sub-mode of comparing each application to be executed to the inventory recordation. The default of the computer program of the present invention is that the Smart mode toggles to the second sub-mode upon execution of any Internet browser or any e-mail client. The computer program may also allow the user the option to deselect either of these at-risk applications or add additional at-risk applications.

Although not required, it is expected that the Smart protected mode will be used for a discrete period of time after the user initially installs the computer program of the present invention. For example, the Smart protected mode may be used for two weeks, after which the computer program automatically activates the "Always On" protected mode. The computer program may include a default time period after installation of the computer program, or the computer program may offer the user an option to select a period of time different than the default time period. A default period of time of several days to several weeks is long enough that most applications the user will ever execute on the computing device will be accessed during the period of time due to normal use of the computing device by the user. During this time period, the user is essentially training the computer program by executing applications that are then added to the user's inventory recordation. After the default or user-selected time period has expired and the computer program activates the "Always On" protected mode, should the user attempt to execute an application that is not on the inventory recordation, the user can simply activate the training mode and execute the application in the training mode to update the inventory recordation.

As also discussed above, when the "Always On" variation of the protected mode is activated, the computer program is continually monitoring each application requested by the user to be executed. Should the application not be listed on the inventory recordation, execution of the application is blocked, as illustrated in FIG. 8. The application monitoring and blocking features are implemented regardless of other applications executed on the computing device, such as an Internet browser or other at-risk application.

Upon initial installation of the computer program, the training mode is automatically activated or, alternatively, the user is instructed to activate the training mode. The user is then instructed to execute all the applications that the user accesses on a regular basis. Execution of each of the applications compiles the inventory recordation personal to the user. After the user has completed executing their regularly-used applications, the user is instructed to activate the preferred variation of the protected mode, which for new users is preferably the Smart protected mode. Once the Smart protected mode is activated, the user uses the computing device as they normally would for an extended period of time, such as several days to several weeks. During activation of the Smart protected mode, the blocking of all applications will only be initiated upon the user executing an at-risk application, such as an Internet browser. Upon executing the at-risk application, the Smart protected mode toggles to the second sub-mode of instructing termination of execution of all applications not listed on the inventory recordation. If an at-risk application is not executed by the user while in the Smart protected mode, the computer program continues the compiling of the inventory recordation by continually monitoring and comparing each accessed application to the current inventory recordation and updating the inventory recordation with any newly-executed applications.

After the extended training time afforded via the Smart protected mode is over, the user may optionally activate the Always On protected mode (or, alternatively, the computer program automatically activates the Always On protected mode after the expiration of a pre-set period of time, as described above). Once in the Always On protected mode, all applications not listed on the inventory recordation are blocked (i.e., execution is instructed to be terminated), regardless of whether the user has executed an at-risk application, such as an Internet browser.

Off Mode

In yet further embodiments of the present invention, the user may activate a third program mode, wherein the application execution blocking features described above for the protected mode are permanently Off, and the program mode does not change until selective activation by the user. This "Off" program mode essentially permanently turns off any virus/malware prevention feature. Because the Off program mode places the computing device at risk for executing a virus or item of malware, embodiments of the present invention may require the user to enter a password or perform some advanced steps to activate this program mode. This would then prevent accidental activation of the off program mode or activation by a lesser-skilled user.

Additional Features

Embodiments of the present invention provide several user-selectable options to customize the computer program to the user. In a first option, the user may select when the computer program is activated, and specifically, when the protected mode is activated, as illustrated at 110 in FIG. 7. A default preference is that the protected mode is activated anytime the computing device is powered on or restarted or the operating system is booted.

As is known in the art, many updates to the operating system and to applications are automatically pushed to the computing device. Similarly, backups of the computing device are often routinely and automatically performed. To address these automatic updates and backups, the computer program offers the option of deactivating the protected mode upon the computing device being idle for a pre-set period of time, as illustrated at 112 in FIG. 7. The user has the option of selecting the pre-set period of time, but exemplary idle times are five minutes, ten minutes, thirty minutes, or greater than or equal to one hour. Alternatively, the pre-set idle time can be instructed to be the same as the pre-set time before which the screen saver of the computing device activates.

If the computing device is idle and the protected mode is deactivated, then the training mode is automatically activated. Any updates that are pushed to the computing device are automatically compared to the current inventory recordation and added if the update has a new pathname for the application. Thus, the computer program of the present invention does not interfere with routine operation and maintenance of the computing device. Upon the user accessing the computing device, i.e., terminating the device being idle, the protected mode is automatically activated.

Similar to the password feature while in the off program mode, another feature of embodiments of the present invention is a user-selectable required password or authentication procedure to activate the training mode. In particular, the computer program may present a user-selectable option for requiring that a password be submitted upon receipt of the user's request to activate the training mode (or otherwise deactivate the protected mode). The training mode would then not be activated by the computer program until entry of the correct password or submission of the required authentication. This prevents a child or unskilled user from activating a mode that would place the computing device at risk of executing a virus or item of malware. This feature may also be desirable in an enterprise environment, wherein the administrator selects this option and an administrator password is required to deactivate the protected mode.

The user may also select whether to receive balloon notifications of the blocking of an application, which is illustrated at 108 in FIG. 8. In the user preferences box 104 of FIG. 7, the user may enable balloon notifications, as illustrated at 114 in FIG. 7. Regardless of whether balloon notifications are enabled, the smart icon 100 flashes when an application is blocked so as to visually notify the user of the blocked application.

Embodiments of the present invention also allow the user to view the inventory recordation personal to the user, including the information uniquely identifying each of the applications. This feature may be beneficial to skilled users. The computer program may also require a password to modify the inventory recordation or may altogether prevent manual modification of the inventory recordation (i.e., not otherwise compiling the inventory recordation as described above).

Smart Icon

The computer program of embodiments of the present invention uses the smart icon 100 as a user interface. Use of the smart icon provides for an unobtrusive user experience. Although the smart icon 100 is specifically described herein with respect to the above-described virus/malware prevention system, the smart icon could be used for a variety of computer programs implementing various functions.

As illustrated in FIG. 5, the smart icon 100 is relatively small compared to the overall display size of the computing device, and as such, the smart icon 100 is approximately 50×50 pixel, although it can be enlarged or made smaller based upon user preference. In embodiments of the present invention, the smart icon offers unlimited left and/or right-click user options. The smart icon 100 is not simply a shortcut to the application, and right-clicking of the icon does not simply present standard "shortcut" options, such as "open," "cut," "copy," etc. Instead, the smart icon 100 is the application itself and left and/or right clicking the smart icon 100 presents a menu 122 of user-selectable application operations.

In Microsoft Windows™, the smart icon 100 is a Microsoft Windows Form with the ControlBox set to "False" and FormBorderStyle set to "None." The smart icon 100 exhibits a transparent background with an overlay of a standard software icon. The smart icon thus visually appears as a standard desktop icon, while giving it the ability to offer the unlimited left and/or right-click user options. This includes, but is not limited to, the activation and deactivation of the particular program mode, as illustrated at 122 in FIG. 6. The relatively small size of the smart icon allows the user to easily activate and deactivate the training mode or any other program mode while remaining unobtrusive to the user experience. Upon left click of the smart icon 100, the appearance of the smart icon toggles between an image that represents the protected mode being "active" (FIG. 5), and an image that represents the protected mode being "inactive" (i.e., the training mode is activated) (FIG. 4). For each successive left mouse click, the protected mode is activated or deactivated, respectively.

In one embodiment, the smart icon 100 is located in one of the four computer monitor corners, as selected by the user, and is always on top of all other program windows (FIG. 5). In other embodiments, the smart icon can be moved or dragged anywhere on the computer desktop by the user to ensure the unobtrusive user experience. Other embodiments include, but are not limited to, placing the smart icon in the Task Bar or Tray Menu area of the desktop screen. When the user performs a right click on the smart icon, the menu 122 appears that allows the user to manipulate the various user-controlled elective options, as described above and as illustrated in FIG. 6.

Whenever a new application that is not listed on the inventory recordation is initiated and detected by the computer program, the smart icon 100 temporarily flashes to alert the user that a new application is attempting to run, start, or execute. As described above, the computer program instructs the operating system to simultaneously terminate execution of the application when in the protected mode. In addition to or as an alternative to the smart icon flashing, the computer program may present the balloon 108 to the user noting that an application's execution has been terminated, as illustrated in FIG. 8. As mentioned above, this will inform the user to activate the training mode if the blocked application was a legitimate application the user was attempting to access but that was not otherwise listed on the inventory recordation.

Although the invention has been described with reference to the embodiments illustrated in the attached drawing figures, it is noted that equivalents may be employed and substitutions made herein without departing from the scope of the invention as recited in the claims. Embodiments of the present invention may, prior to allowing execution of an application, perform a comparison of the application to a list of known viruses/malware. This would be a secondary defense to insuring that the computing device does not execute a virus. However, this will also use up additional processing power of the computing device, as the list of known viruses on a day-to-day basis is very large (e.g., multiple tens of thousands), and comparison of the yet-to-be-approved application to the list of known viruses will require more time than comparison of the application to the inventory recordation.

The invention claimed is:

1. A non-transitory computer-readable storage medium with an executable program stored thereon for preventing execution of a virus or malware on a computing device, wherein the program instructs a processor to perform the steps of:
   perform an instantaneous and unprompted inventory recordation of all currently running processes,
   wherein the inventory recordation comprises information uniquely identifying a listing of processes approved for execution by the processor during use of the program by a user;
   build the inventory recordation, wherein said building step further comprises instructing the processor to perform the steps of:
   receive information identifying at least one application requested by the user to be executed by the computing device,
   supplement the inventory recordation to include the information identifying the at least one requested application;
   activate a protected mode, wherein the protected mode is activated in response to a request to execute a network application;
   receive, while the protected mode is activated, information indicative of an instruction by the user to execute a new application, wherein the information indicative of an instruction by the user to execute the new application includes information identifying the new application;
   compare, while the protected mode is activated, the information identifying the new application with information identifying the listing of applications on the inventory recordation that are approved for execution;
   identify, while the protected mode is activated, the new application as an application approved for execution if the information identifying the new application matches with information identifying an application on the inventory recordation;
   identify, while the protected mode is activated, the new application as an application not approved for execution if the information identifying the unconfirmed application does not match with information identifying an application on the inventory recordation. and
   deactivate the protected mode in response to determining that the network application is no longer executing.

2. The computer-readable storage medium of claim 1, wherein the program further instructs the processor to perform the step of:
   present a smart icon to the user,
   wherein the smart icon is a graphical user interface operable to present visual output to the user and receive input by the user,
   wherein the visual output presented by the smart icon is used to at least indicate a protection status selected from the group consisting of protected, unprotected, and process blocked.

3. The computer-readable storage medium of claim 2, wherein the smart icon can be configured for viewability over all other applications.

4. The computer-readable storage medium of claim 2, wherein the smart icon can be configured for minimization into the taskbar.

5. The computer-readable storage medium of claim 2, wherein when the visual output presented by the smart icon is used to indicate a process blocked, the program further instructs the processor to perform the step of:
   present a flashing indicator on the smart icon.

6. The computer-readable storage medium of claim 2, wherein when the visual output presented by the smart icon is used to indicate a process blocked, the program further instructs the processor to perform the step of:
   present the user with an option to enable the blocked process.

7. A computer-implemented method comprising:
   compiling, by a processor of a computer, a listing of processes approved for execution by the processor while a protected mode of the computer is activated;
   receiving, by the processor, a request to execute a network application;
   activating, by the processor, the protected mode in response to receiving the request to execute the network application;
   executing, by the processor, the network application;
   receiving, by the processor, a request to execute a process that is different than the network application while the protected mode is activated;
   determining, by the processor, whether the process is among the listing of processes approved for execution by the processor while the protected mode is activated;
   in response to determining that the process is among the listing of processes approved for execution by the processor while the protected mode is activated, executing, by the processor, the process while the protected mode is activated;
   in response to determining that the process is not among the listing of processes approved for execution by the processor while the protected mode is activated, denying, by the processor, execution of the process while the protected mode is activated; and
   deactivating, by the processor, the protected mode in response to determining that the network application is no longer executing.

8. The computer-implemented method of claim 7, wherein determining whether the process is among the listing of processes approved for execution by the processor while the protected mode is activated comprises comparing a path and file name associated with the process with respective paths and file names associated with the listing of processes.

9. The computer implemented method of claim 7, further comprising:
generating, by the processor for output on a display device, display data representing a graphical user interface, wherein the graphical user interface indicates whether or not the protected mode of the computer is activated.

10. The computer implemented method of claim 9, wherein the display data representing the graphical user interface is configured for viewability over all other executing processes and applications.

11. The computer implemented method of claim 9, further comprising:
adjusting, by the processor, the display data representing the graphical user interface in response to the processor denying execution of one or more processes while the protected mode of the computer is activated.

12. The computer implemented method of claim 11, wherein adjusting the display data representing the graphical user interface comprises generating, by the processor, a flashing indicator as at least a portion of the display data representing the graphical user interface.

13. The computer implemented method of claim 11, wherein adjusting the display data representing the graphical user interface comprises generating, by the processor, a user-option to execute the one or more processes that were denied execution as at least a portion of the display data representing the graphical user interface.

14. A computing system comprising:
memory comprising executable instructions; and
a processor operatively connected to the memory, the processor configured to execute the executable instructions in order to effectuate a method comprising:
compiling a listing of processes approved for execution by the processor while a protected mode of the computing system is activated;
receiving a request to execute a network application;
activating the protected mode in response to receiving the request to execute the network application;
executing the network application;
receiving a request to execute a process that is different than the network application while the protected mode is activated;
determining whether the process is among the listing of processes approved for execution by the processor while the protected mode is activated;
in response to determining that the process is among the listing of processes approved for execution by the processor while the protected mode is activated, executing the process while the protected mode is activated;
in response to determining that the process is not among the listing of processes approved for execution by the processor while the protected mode is activated, denying execution of the process while the protected mode is activated; and
deactivating the protected mode in response to determining that the network application is no longer executing.

* * * * *